United States Patent
Tabe et al.

[11] Patent Number: 5,852,783
[45] Date of Patent: Dec. 22, 1998

[54] INFORMATION TOOLS WITH MULTI-FUNCTIONAL INFORMATION KEY

[75] Inventors: Kazushi Tabe, San Diego, Calif.; Masayuki Hisamura, Tokyo, Japan

[73] Assignees: Sony Corporation, Tokyo, Japan; Sony Electronics, Inc., Park Ridge, N.J.

[21] Appl. No.: 582,541

[22] Filed: Jan. 3, 1996

[51] Int. Cl.[6] .................................................. H04Q 7/00
[52] U.S. Cl. ........................................... 455/550; 455/566
[58] Field of Search .................................... 455/550, 566, 455/556, 403, 422, 412; 379/433, 93.17

[56] References Cited

U.S. PATENT DOCUMENTS

| | | | |
|---|---|---|---|
| 5,487,104 | 1/1996 | Baals et al. | 379/93.17 |
| 5,633,912 | 5/1997 | Tsoi | 455/566 |

FOREIGN PATENT DOCUMENTS

| | | | |
|---|---|---|---|
| 0 590 493 A1 | 4/1994 | European Pat. Off. | H04M 1/00 |
| 590 492 | 4/1996 | European Pat. Off. | |

*Primary Examiner*—Dwayne D. Bost
*Assistant Examiner*—Tracy M. Legree
*Attorney, Agent, or Firm*—Blakely, Sokoloff, Taylor & Zafman LLP

[57] ABSTRACT

An apparatus and a method for providing a multi-finctional information key for use with an information tool which automatically displays the appropriate information. The multi-functional information key displays an appropriate message or data to meet the user's needs at the point when the user presses the INFO key. The displaying of an appropriate message upon pressing of the INFO key is automatic in that the user only needs to press the INFO key and does not have to select or press any other keys to display the information. Thus, the present invention's INFO key always brings the best solution to the user.

8 Claims, 6 Drawing Sheets

INFORMATION TOOLS WITH MULTI-FUNCTIONAL INFORMATION KEY

BACKGROUND OF THE INVENTION

(1) Field of the Invention

The method and apparatus of the present invention is related to the field of personal information tools. More specifically, the present invention is related to information tools equipped with a multi-functional information key.

(2) Prior Art

Currently, there are several different types of personal communication and information tools available including cellular phones, electronic notebooks and portable game machines. Such information tools typically have a limited number of keys due to limited surface space, circuitry space, consideration to design aesthetics and due to cost constraints.

Although, the user interface for cellular phones is typically similar between different products, the actual method and apparatus for accessing data from a cellular phone is different in almost all currently available products. For example, in order to get help messages, some products require a user to press a dedicated "HELP" key. Some other products require an inactive period to retrieve information. To obtain detailed information such as a phone number on a cellular phone, some information tools require a user to press a "RECALL" key and other products require a user to press "*" or "#" key. Other information tools provide for a HELP menu to be displayed on the display screen which are typically easy to understand. However, cellular phones with such HELP menus often require a mouse or some other type of direct pointing device and a wide display screen for menu manipulation.

Thus, obtaining required information and understanding which key or action to take with a given information tool may be difficult to understand. A user may therefore have to depend on a manual for explanatory information on the method of retrieving desired information or attempt at guessing. Even with a menu key which enables the display of a menu, a user must still understand each entry in the menu in order to obtain the results that he or she desires.

It is therefore desirable to have a method and an apparatus for an information tool which allows fast access to desired information and which does not require numerous dedicated keys on a key pad of an information tool for access to this desired information. It is also desirable to have access to more than one functional information and to automatically provide the most appropriate information desired given the activity being performed at the time information is requested.

BRIEF SUMMARY OF THE INVENTION

An apparatus and a method for providing a multi-functional information key for use with an information tool which automatically displays the appropriate information are disclosed. The present invention's multi-functional information key (hereinafter referred to as INFO key) displays the appropriate message or data to meet the user's needs at the point when the user presses the INFO key.

For example, the INFO key displays functional HELP messages for a function when a user is in the process of using that particular function. A pressing of the INFO key may display a message with it's time and date stamps when the message was sent or received, or detailed schedule in a schedule book, or a meeting agenda when a user is looking at a meeting schedule display. Such displaying of an appropriate message upon pressing of the INFO key is automatic in that the user only needs to press the INFO key to display the desired information. Thus, the present invention's INFO key always brings the best solution to the user.

BRIEF DESCRIPTION OF THE DRAWINGS

FIG. 2 illustrates an exemplary display screen and display content which the method and apparatus of the present invention may be implemented with.

DETAILED DESCRIPTION OF THE INVENTION

The present invention is a method and an apparatus for a multi-functional information key for use with an information tool. The present invention's multi-functional information key (hereinafter referred to as INFO key) automatically displays the appropriate message or data to meet the user's needs at the point when the user presses the INFO key.

Figure 1:
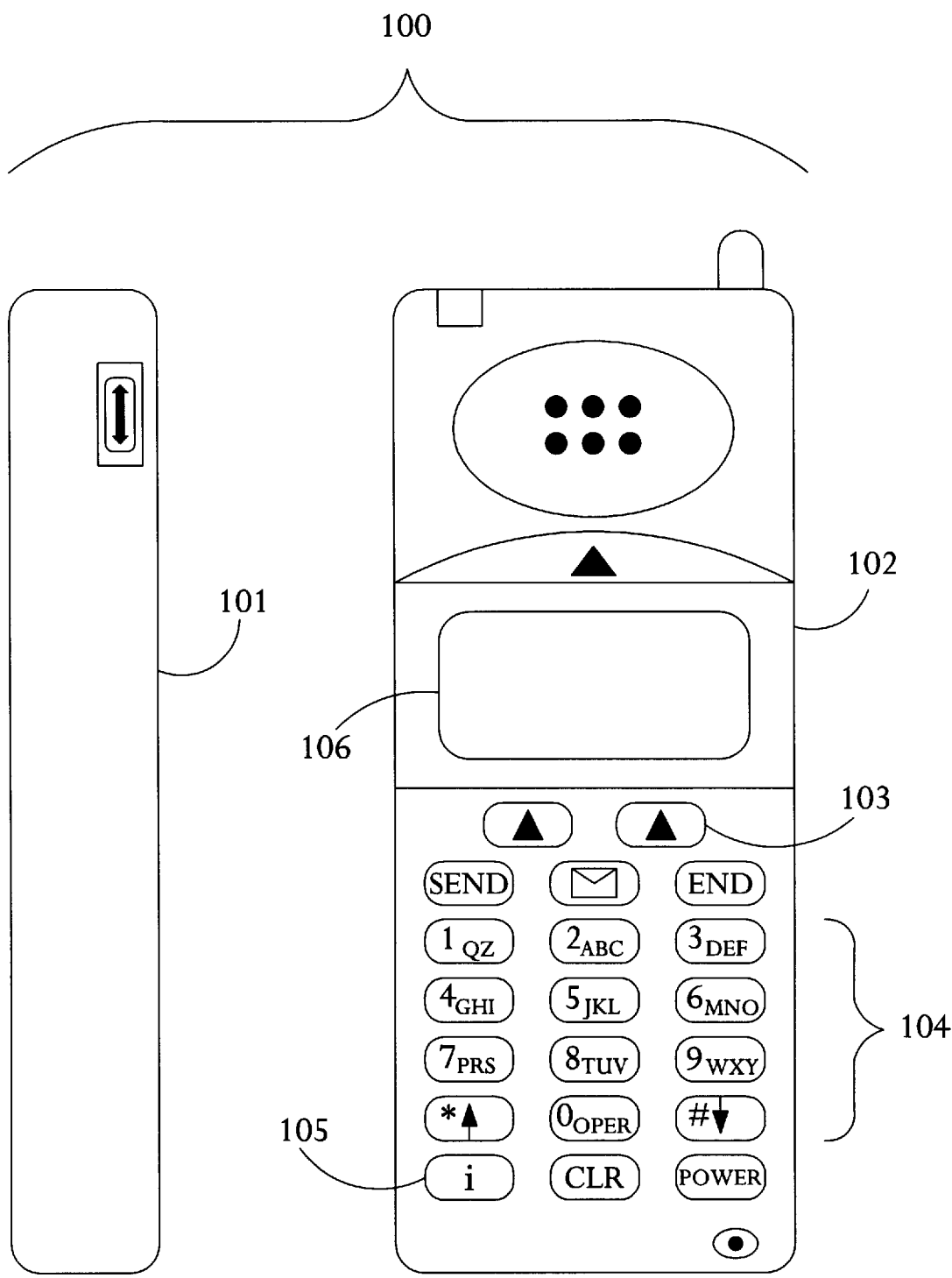
FIG. 1 illustrates an exemplary control panel of a typical cellular phone.

FIG. 1 illustrates an exemplary control panel of a cellular phone with an exemplary implementation of the present invention. View 101 is a side view of an exemplary control panel and view 102 is a frontal view of the exemplary control panel of cellular phone 100. Exemplary cellular phone 100 has keypad 104, INFO key 105 and soft keys 103. INFO key 105 automatically enables the display of the appropriate information on display screen 106 when depressed. The information which is displayed is tailored to the state of cellular phone 100 at the time INFO key 105 is pressed. INFO key 105 is especially useful when the user of cellular phone 100 does not know what step to take next on cellular phone 100 and needs to be directed by, for example, a help message or by the automatic appearance of the next logical display screen to be manipulated or viewed. The specific location of INFO key 105 as illustrated on FIG. 1 is for illustration purposes only. The actual location of INFO key 105 may therefore vary with different implementations of the present invention.

Figure 2:
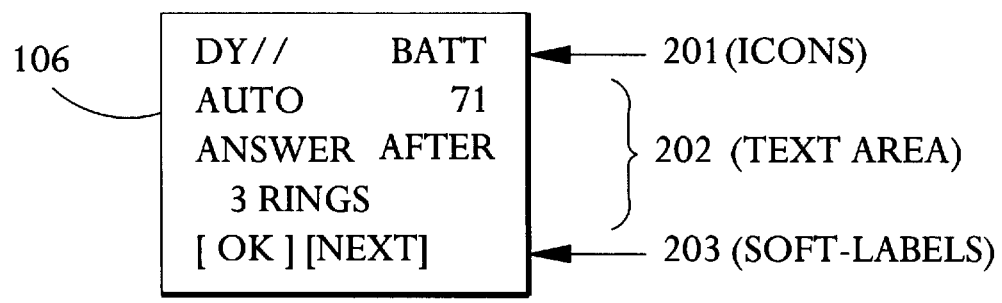

FIG. 2 illustrates an exemplary display screen with exemplary display content which cellular phone 100 illustrated in FIG. 1 may display. Exemplary display screen 106 displays icons 201, text area 202 with various text information and soft-labels 203 for soft-keys 103.

Figure 3A:
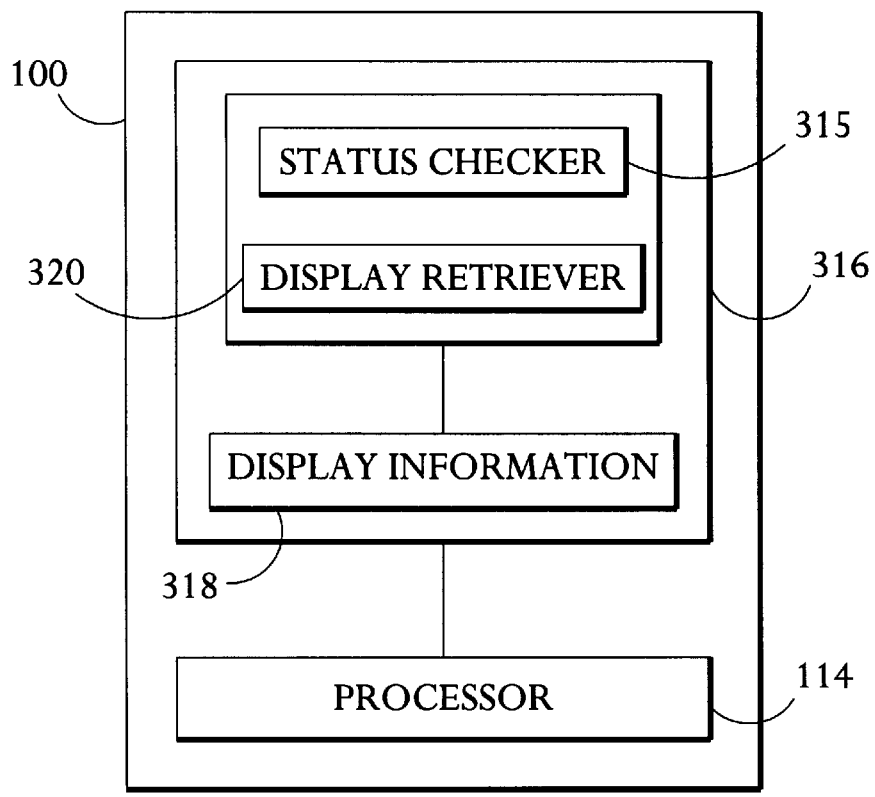
FIG. 3a is a block diagram of the method and apparatus of the present invention.

FIG. 3*a* illustrates a block diagram with an exemplary implementation of the method and apparatus of the present invention. Cellular phone 100 has processor 114 coupled to storage device 112. Storage device 112 has multi-functional information tool mechanism 316 of the present invention and display information 318. When a user presses INFO key 105, status checker 315 of multi-functional information tool mechanism 316 checks the current status of the cellular phone and enables the automatic display of a screen with the appropriate message or data which meets the user's needs. The information displayed on the cellular phone screen may be retrieved from display information 318 by display retriever 320.

Figure 3B:
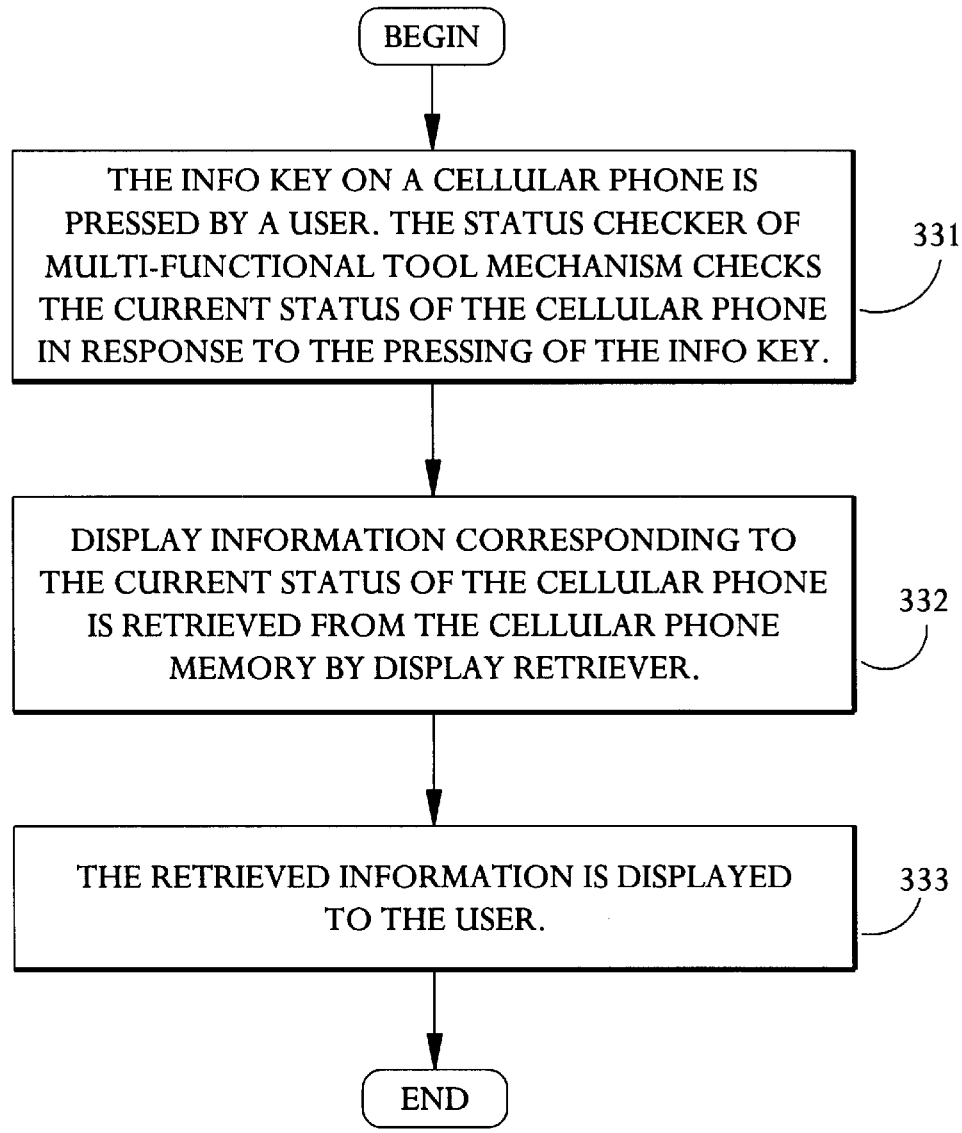
FIG. 3b is a flow diagram illustrating the general steps followed by the present invention.

FIG. 3*b* is a flow diagram illustrating the general steps followed by the present invention. In step 331, INFO key 105 is pressed by a user of cellular telephone 100. Status checker 315 checks the current status of cellular phone 100. In step 332, display information corresponding to the current status of cellular phone 100 is retrieved from storage device 112 by display retriever 320. The specific display information which corresponds to a given current status of a cellular phone may vary depending on different implementations of the present invention. Exemplary current status of a cellular phone as well as the corresponding display information are illustrated in the description accompanying FIGS. 4 through 10 below. In step 333, the retrieved display information corresponding to the current status of cellular phone 100 is displayed to the user.

FIGS. 4 through 10 illustrate exemplary embodiments of the present invention illustrating exemplary states of a typical cellular phone and the appropriate display which may be automatically displayed to the user upon his or her pressing of INFO key 105.

Figure 4:
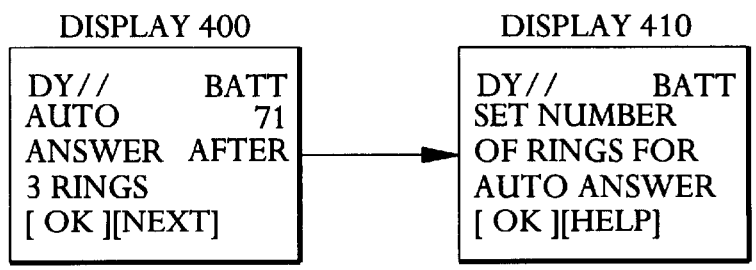
FIG. 4 illustrates sample displays for an auto answer setting of an exemplary cellular phone with an implementation of the present invention.

FIG. 4 illustrates sample displays for an auto answer setting of an exemplary cellular phone. With an auto answer setting, a cellular phone forwards in-coming calls to for example, a voice mail system, if the call is not answered after a user designated number of rings. For example, a cellular phone user may designate through auto answer setting that he or she would like all incoming calls forwarded to some other number or voice mail, after three rings. When a setting display such as the one shown in display 400 is displayed, the present invention's INFO key 105 displays a functional HELP message for the auto setting or designate the type of input required by the user for the auto setting. Thus when display screen 106 is displaying display 400, an exemplary function for an auto answer setting, INFO key 105 displays display 410. Another INFO key press displays the original display, display 400. The present invention is not limited to use with the auto answering setting function. The present invention also displays similarly helpful information for other setting functions available on a cellular phone as can be illustrated in FIG. 5 below.

Figure 5:
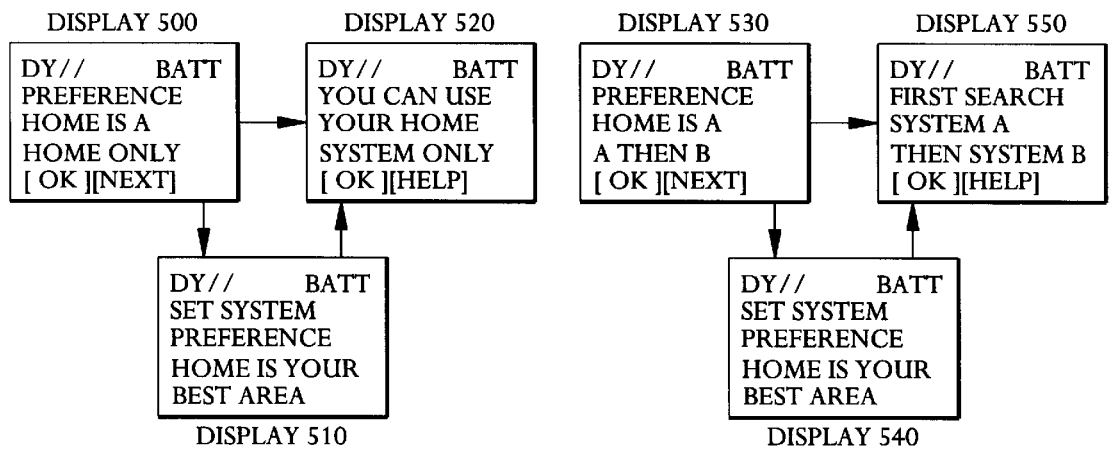
FIG. 5 illustrates an exemplary display for a prefer system setting with an implementation of the present invention.

FIG. 5 illustrates an exemplary display for a prefer system setting function. A prefer system typically allows a user to choose the carrier they prefer to use. In some functions of an exemplary cellular phone including for the prefer system setting function illustrated in displays 500 and 530, INFO key 105 of the present invention displays a HELP message. Thus, if the displayed setting function option is difficult to understand, a user may press INFO key 105 which displays a HELP message for the current displayed function. When display 500 or display 530, both displaying exemplary functions for a prefer system setting, is displayed on display screen 106, the present invention may be implemented such that a pressing of INFO key 105 displays useful information such as those in displays 510, 520, 540 or 550.

Figure 6:
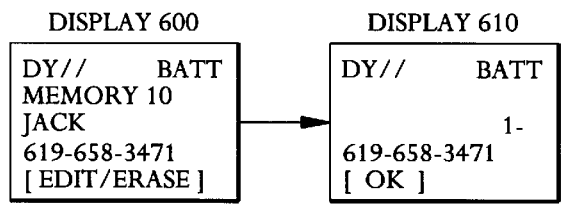
FIG. 6 illustrates exemplary displays which may be displayed when the current status of the cellular phone is in speed dial memory mode with an implementation of the present invention.

FIG. 6 illustrates exemplary screen displays which may be output to the user when the current status of cellular phone 100 is in speed dial memory mode. The concept of speed dial memory mode as used with cellular phones is well known in the art. With a speed dial memory mode, a user may store frequently used phone numbers in a cellular phone's memory. The phone numbers may then be recalled and dialed automatically without the actual input of each digit of the phone number. With the present invention, a pressing of INFO key 105 while a cellular phone is in speed dial memory mode displays information which would typically be desired by a user in speed dial memory mode.

For example, when cellular phone 100 is displaying a phone number, and the display status is therefore PHONE NUMBER, typically only a portion of the number can be shown as illustrated in display 600 because of the limited display space available on a cellular phone. With the present invention, cellular phone 100 may display the entire phone number or the remaining portion of the phone number depending on the display size, with a single depression of INFO key 105 by the user. Thus a pressing of INFO key 105 displays display 610. Another pressing of INFO key 105 brings back the original display 600.

Figure 7:
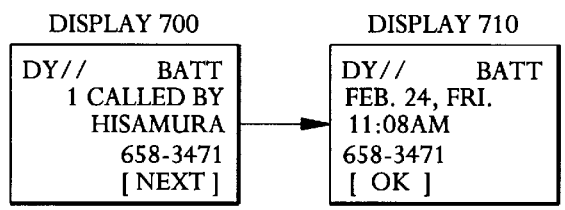
FIG. 7 illustrates exemplary displays displayed when a cellular phone is in call in absence status with an implementation of the present invention.

FIG. 7 illustrates exemplary displays when cellular phone 100 is in call in absence status. A call in absence feature of a cellular phone is well understood in the art. A call in absence message is displayed for a user to indicate that a call came in in the absence of the user. If a call in absence feature is supported by a given cellular phone, the cellular phone holds call records which may include a caller's phone number, receive date and receive time. For example, when a cellular phone displays information such as in display 700, display 710 is displayed once INFO key 105 is pressed. Another pressing of the INFO key then brings back the original display 700.

Figure 8:
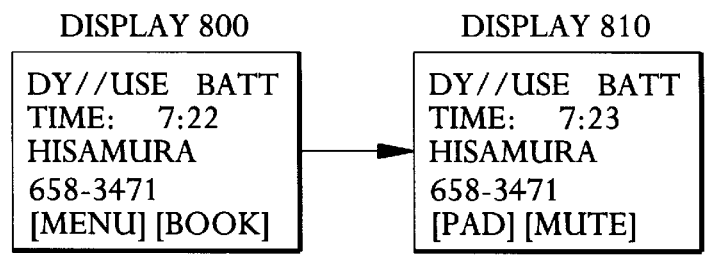
FIG. 8 illustrates exemplary displays displayed when a cellular phone is in use with an implementation of the present invention.

FIG. 8 illustrates exemplary displays associated with cellular phone 100 in use (i.e. when a user is making a call or when the user is receiving a call.) If cellular phone 100 has soft labels 203 for soft keys 103, INFO key 105 may display an alternate soft label set. For example, display 800 is a display which appears on display screen 106 when cellular phone 100 is in use without any other special functions being performed. Cellular phone 100 changes display screen 106 to display 810 by the pressing of INFO key 105. The bracketed portion in both display screens illustrates exemplary functions which may be performed corresponding to soft labels 203 of soft keys 103 on exemplary cellular phone 100.

Figure 9:
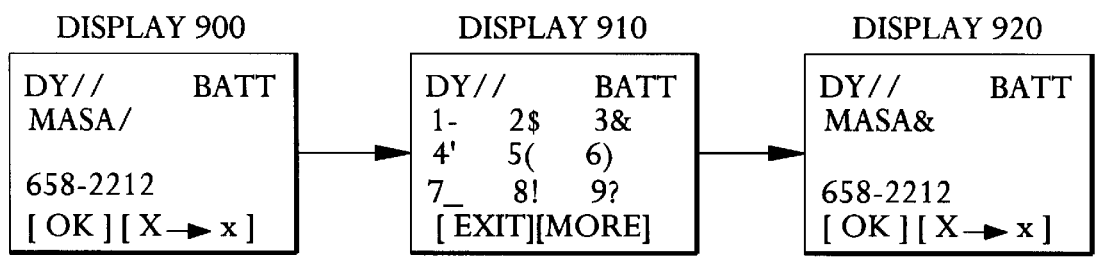
FIG. 9 illustrates sample displays for a marked table function with an implementation of the present invention.

FIG. 9 illustrates sample displays for a marked table function. Typically ten keys are used for an alphabet entry and some other keys are used for special character entries to a typical cellular phone. With the availability of a marked table function, a user can select additional special characters for input from a special character table on a screen which may be displayed after the pressing of INFO key 105. Exemplary display 900 is a display in an alphabet entry and pressing of INFO key 105 brings a special character table display 910. After pressing of INFO key 105, display 920 may be displayed showing the special character selected by the user from the special character table. In the example, the alpha-numeric key associated with the number 3 is now associated with the & character.

Figure 10:
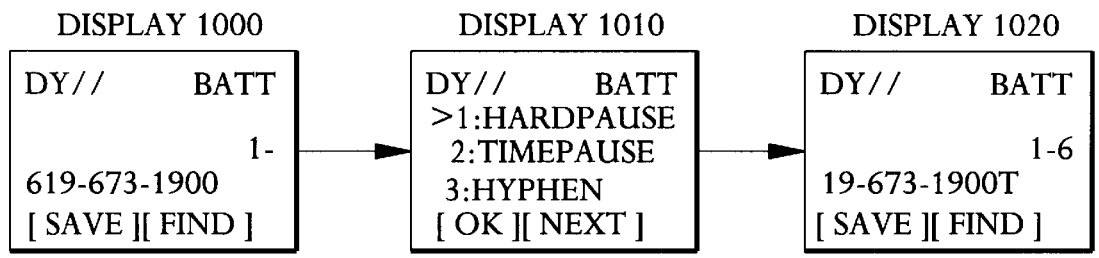
FIG. 10 illustrates sample displays for a hyphen and a pauseless menu with an implementation of the present invention.

FIG. 10 illustrates sample displays for a hyphen and a pauseless menu. When a user is entering a phone number and he or she desires to insert a PAUSE code or a manual hyphen as displayed in display 1000, the pressing of INFO key 105 displays a list menu as displayed on display 1010. Display 1020 is displayed upon a menu selection by a user of, for example, number two for time pause. The original display 1000 changes to display 1010 upon the pressing of INFO key 105 by the user. Display 1010 displays information tailored to display 1000. Once the user selects the desired function from display 1010, the screen changes to display 1020 which is essentially display 1000 but reflecting the function selected by the user.

The types of current status and displays displayed upon the pressing of INFO key 105 as illustrated in FIGS. 4 through 10 are for illustrative purposes and are not exhaustive of the types of current status and INFO key displays possible with the present invention. The present invention may therefore be implemented for other current status and with different INFO key displays.

Figure 11:
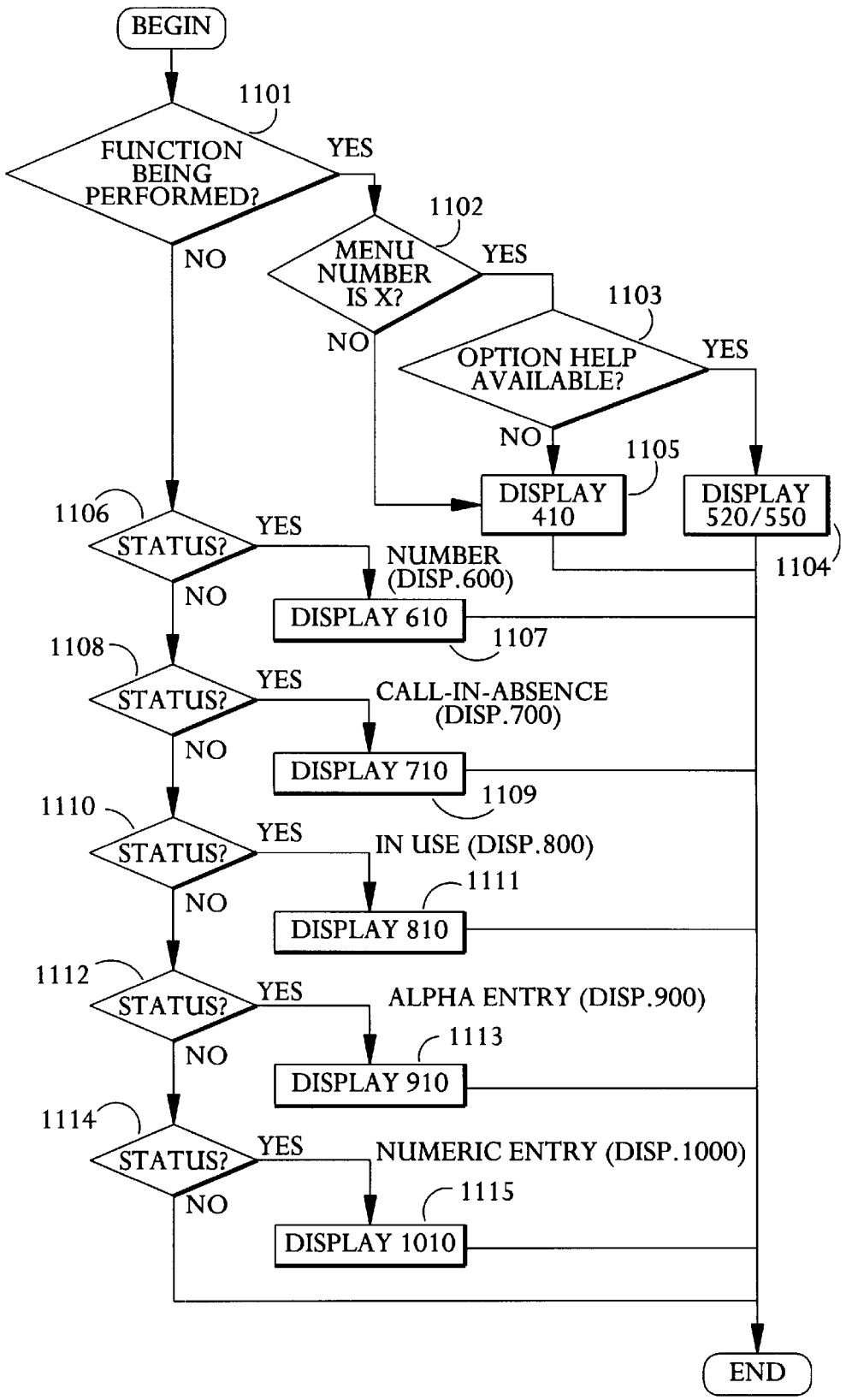
FIG. 11 illustrates a flow diagram showing the general steps that may be followed by an exemplary implementation of the present invention.

FIG. 11 illustrates a flow diagram showing the general steps that may be followed by an exemplary embodiment of the present invention having an INFO key facility for the exemplary functions and display status illustrated in FIGS. 4 to 10. If a user is performing or attempting to perform a function in step 1101 and if the menu number is X in step 1102 and if an option HELP is available in step 1103, then in step 1104 display 520 and 550 may be displayed. Otherwise, if HELP is not available for an option, then in step 1105, display 410 is displayed.

In step 1106, if a function is not being performed but a numeric entry is being performed, then in step 1107 display 610 is displayed. Otherwise, in step 1108, if the status of cellular phone 100 is call in absence, then in step 1109, display 710 is displayed. In step 1110, if the status of the cellular phone is in use, then display 810 is displayed in step 1111. In step 1112, if an alphabetical entry has been made on cellular phone 100, then in step 1113, display 1020 is displayed. If in step 1114, a user has entered a numeric entry, then in step 1115, display 1010 is displayed.

With this embodiment of the present invention, several different current status of cellular phone 100 may be monitored for when INFO key 105 is pressed and the appropriate display corresponding to the particular status of cellular phone 100 at the time INFO key 105 is pressed may be displayed to the user.

What has been described is a method and an apparatus for an information tool with multi-funcitonal information mechanism. The present invention provides the display information corresponding to a current status of a given cellular phone upon the pressing of the present invention's INFO key by a user. Whenever a user has questions or is unable to continue due to lack of information, the pressing of INFO key automatically displays information to the user helping the user determine his or her next move. The present invention's INFO key displays include functional help messages, a meeting agenda when a user is viewing a meeting schedule, a character table and a prompt to enter characters when a user is inputting an alphanumeric message.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for a multi-functional information tool for use on a cellular phone for producing a display screen appropriate to the current status of the cellular phone, said method comprising:

pressing a multi-functional information key on said cellular phone to provide further information and to automatically extend functions; and displaying a display screen with said extension and further information to a user according to said current status of said cellular phone and a current function being performed, said displaying being performed in response to said pressing of said multi-functional information key, wherein said further information includes a plurality of help messages, including status report, description of active functions and user instructions.

2. The method of claim 1 wherein said displaying further comprises the step of checking said status of said cellular phone by checking the last input to said cellular phone prior to said pressing of said information key.

3. The method of claim 2 further comprising the step of checking said status by checking information on said screen display of said cellular phone.

4. The method of claim 3 further comprising the step of retrieving display screen corresponding to said current status from a screen display information storage element.

5. A cellular phone with a multi-functional information tool mechanism comprising:

a multi-functional information key for activating said multi-functional information tool mechanism;

a multi-functional tool mechanism coupled to said multi-functional information key, said multi-functional tool mechanism configured to be stored on a computer readable medium, to enable display of further information on a display screen to a user and to automatically extend functions according to a current status of said cellular phone and a current function being performed at the time said multi-functional information key on said cellular phone is pressed, said displaying being performed in response to said pressing of said multi-functional information key, said further information including a plurality of help messages including status report, description of active functions and user instructions; and a processor coupled to said storage element, said processor configured to execute said multi-functional information tool mechanism.

6. The cellular phone of claim 5 wherein said multi-functional information tool mechanism comprises of a status checker for checking most recent input to said cellular phone prior to said pressing of said information key.

7. The cellular phone of claim 5 wherein said multi-functional information tool mechanism further comprises a display retriever for retrieving display screen information for display upon pressing of said information key.

8. The cellular phone of claim 6 wherein said status checker checks information displayed on said display screen prior to pressing of said information key.

* * * * *